US008930676B2

(12) United States Patent
Henry et al.

(10) Patent No.: US 8,930,676 B2
(45) Date of Patent: Jan. 6, 2015

(54) MASTER CORE DISCOVERING ENABLED CORES IN MICROPROCESSOR COMPRISING PLURAL MULTI-CORE DIES

(75) Inventors: G. Glenn Henry, Austin, TX (US); Darius D. Gaskins, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 406 days.

(21) Appl. No.: 13/299,207

(22) Filed: Nov. 17, 2011

(65) Prior Publication Data

US 2012/0166763 A1 Jun. 28, 2012

Related U.S. Application Data (60) Provisional application No. 61/426,470, filed on Dec. 22, 2010.

(51) Int. Cl.
*G06F 15/16* (2006.01)
*G06F 1/32* (2006.01)
*G06F 15/17* (2006.01)
*G06F 9/44* (2006.01)

(52) U.S. Cl.
CPC .............. *G06F 1/3206* (2013.01); *G06F 15/16* (2013.01); *G06F 15/17* (2013.01); *G06F 9/4403* (2013.01)
USPC .............................................. 712/32; 712/28

(58) Field of Classification Search
None
See application file for complete search history.

(56) References Cited

U.S. PATENT DOCUMENTS

| 5,467,455 | A | 11/1995 | Gay et al. |
| 5,546,588 | A | 8/1996 | Deems et al. |
| 5,587,987 | A | * 12/1996 | Okabe ........................ 369/126 |
| 5,918,061 | A | 6/1999 | Nikjou |
| 6,496,880 | B1 | 12/2002 | Ma et al. |
| 6,665,802 | B1 | 12/2003 | Ober |
| 6,968,467 | B2 | 11/2005 | Inoue et al. |
| 7,257,679 | B2 | 8/2007 | Clark |

(Continued)

FOREIGN PATENT DOCUMENTS

CN 101901177 12/2010

OTHER PUBLICATIONS

Sartori, John et al. "Distributed Peak Power Management for Many-core Architectures." Published in Design, Automation & Test in Europe Conference & Exhibition, Apr. 2009, pp. 1556-1559.

(Continued)

*Primary Examiner* — Kenneth Kim
(74) *Attorney, Agent, or Firm* — E. Alan Davis; James W. Huffman; Eric W. Cernyar (57) ABSTRACT

A core configuration discovery method and corresponding microprocessor are provided that does not rely on off-core logic or queries by system BIOS. Reset microcode is provided in the microprocessor's cores. Upon reset, the microcode queries and/or receives from other cores configuration-revealing information and collects the configuration-revealing information to determine a composite core configuration for the microprocessor. The composite core configuration may reveal the number of enabled cores, identify the enabled cores, reveal a hierarchical coordination system of the multi-core processor, such as a nodal map of the cores for certain inter-core communication processes or restricted activities, identify various domains and domain masters within such a system, and/or identify resources, such as voltage sources, clock sources, and caches, shared by various domains of the microprocessor. The composite core configuration may be used for power state management, reconfiguration, and other purposes.

26 Claims, 3 Drawing Sheets (56) References Cited

U.S. PATENT DOCUMENTS

| | | | |
|---|---|---|---|
| 7,358,758 B2 | 4/2008 | Gaskins et al. | |
| 7,451,333 B2 | 11/2008 | Naveh et al. | |
| 7,467,294 B2 | 12/2008 | Matsuoka et al. | |
| 8,024,591 B2 | 9/2011 | Bertelsen et al. | |
| 8,046,615 B2 * | 10/2011 | Taguchi et al. | 713/322 |
| 8,103,816 B2 | 1/2012 | Tiruvallur et al. | |
| 8,214,632 B2 * | 7/2012 | Choi et al. | 713/2 |
| 8,358,651 B1 | 1/2013 | Kadosh et al. | |
| 8,359,436 B2 | 1/2013 | Vash et al. | |
| 2004/0117510 A1 | 6/2004 | Arimilli et al. | |
| 2005/0138249 A1 | 6/2005 | Galbraith et al. | |
| 2006/0224809 A1 | 10/2006 | Gelke et al. | |
| 2006/0282692 A1 | 12/2006 | Oh | |
| 2007/0070673 A1 | 3/2007 | Borkar et al. | |
| 2007/0143514 A1 | 6/2007 | Kaushik et al. | |
| 2007/0266262 A1 | 11/2007 | Burton et al. | |
| 2008/0129274 A1 | 6/2008 | Komaki | |
| 2009/0083516 A1 | 3/2009 | Saleem et al. | |
| 2009/0094481 A1 | 4/2009 | Vera et al. | |
| 2009/0172423 A1 | 7/2009 | Song et al. | |
| 2009/0233239 A1 | 9/2009 | Temchenko et al. | |
| 2009/0307408 A1 | 12/2009 | Naylor | |
| 2009/0319705 A1 | 12/2009 | Foong et al. | |
| 2010/0058078 A1 | 3/2010 | Branover et al. | |
| 2010/0138683 A1 | 6/2010 | Burton et al. | |
| 2010/0250821 A1 | 9/2010 | Mueller | |
| 2011/0185125 A1 | 7/2011 | Jain et al. | |
| 2011/0265090 A1 | 10/2011 | Moyer et al. | |
| 2011/0271126 A1 | 11/2011 | Hill | |
| 2011/0295543 A1 | 12/2011 | Fox et al. | |
| 2012/0005514 A1 | 1/2012 | Henry et al. | |
| 2012/0023355 A1 | 1/2012 | Song et al. | |
| 2012/0124264 A1 | 5/2012 | Tiruvallur et al. | |
| 2012/0161328 A1 | 6/2012 | Henry et al. | |
| 2012/0166764 A1 | 6/2012 | Henry et al. | |
| 2012/0166832 A1 | 6/2012 | Gaskins et al. | |
| 2012/0166837 A1 | 6/2012 | Henry et al. | |
| 2012/0166845 A1 | 6/2012 | Henry et al. | |
| 2012/0239847 A1 | 9/2012 | Gaskins | |

OTHER PUBLICATIONS

"Intel® Core™ 2 Extreme Quad-Core Mobile Processor and Intel® Core™ 2 Quad Mobile Processor on 45-nm Process." Datasheet. For platforms based on Mobile Intel® 4 Series Express Chipset Family. Jan. 2009 Document No. 320390-002 pp. 1-72.

"Intel® Atom™ Processor 330$^\Delta$ Series." Datasheet. For systems based on Nettop Platform for '08. Revision 002. Feb. 2009. Document No. 320528-002. pp. 1-50.

"Intel® Core™ 2 Duo Processors and Intel® Core™ 2 Extreme Processors for Platforms Based on Mobile Intel® 965 Express Chipset Family." Datasheet. Jan. 2008. Document No. 316745-005. pp. 1-87.

"Intel® Core™ Duo Processor and Intel® Core™ Solo Processor on 65 nm Processs." Datasheet. Jan. 2007. Document No. 309221-006. pp. 1-91.

Richard, Michael Graham. "Intel's Next CPU to Include Dedicated 'Power Control Unit' to Save Power." Aug. 22, 2008. Downloaded from http://www.treehugger.com/files/2008/08/intel-cpu-processor-nehalem-i7-power-pcu.php on Jul. 14, 2010. pp. 1-4.

Naveh, Alon et al. "Power and Thermal Management in Intel® Core™ Duo Processor." Intel® Technology Journal. vol. 10, Issue 02, Published May 15, 2006. ISSN 1535-864X pp. 109-123.

Glaskowsky, Peter. "Investigating Intel's Lynnfield Mysteries." Mcall.com, CNET News, Speeds and Feeds. Sep. 21, 2009. Downloaded from http://mcall.com.com/8301-13512_3-10357328-23. html?tag=mncol;txt downloaded on Jul. 14, 2010. pp. 1-4.

Wasson, Scott. "Intel's Core i7 Processors; Nehalem Arrives with a Splash." The Tech Report. Nov. 3, 2008. Downloaded from http://techreport.com/articles.x/15818/1 on Jul. 14, 2100. pp. 1-11.

"Intel® QuickPath Architecture; A New System Architecture." White Paper Document No. 319725-001US. Mar. 2008 pp. 1-6.

* cited by examiner

MASTER CORE DISCOVERING ENABLED CORES IN MICROPROCESSOR COMPRISING PLURAL MULTI-CORE DIES

CROSS REFERENCE TO RELATED APPLICATION(S)

This application claims priority based on U.S. Provisional Application Ser. No. 61/426,470, filed Dec. 22, 2010, entitled MULTI-CORE INTERNAL BYPASS BUS, which is hereby incorporated by reference in its entirety.

This application is related to the following co-pending U.S. Patent Applications which are concurrently filed herewith, each of which is hereby incorporated by reference in its entirety.

| Serial Number | Filing Date | Title |
| --- | --- | --- |
| 13/299,014 | herewith | MULTI-CORE INTERNAL BYPASS BUS |
| 13/299,059 | herewith | POWER STATE SYNCHRONIZATION IN A MULTI-CORE PROCESSOR |
| 13/299,122 | herewith | DECENTRALIZED POWER MANAGEMENT DISTRIBUTED AMONG MULTIPLE PROCESSOR CORES |
| 13/299,171 | herewith | RETICLE SET MODIFICATION TO PRODUCE MULTI-CORE DIES |
| 13/299,225 | herewith | DISTRIBUTED MANAGEMENT OF A SHARED POWER SOURCE TO A MULTI-CORE MICROPROCESSOR |
| 13/299,239 | herewith | DYNAMIC AND SELECTIVE CORE DISABLEMENT AND RECONFIGURATION IN A MULTI-CORE PROCESSOR |

FIELD OF THE INVENTION

The present invention relates in general to the field of multi-core microprocessors, and particularly to dynamic configuration thereof.

BACKGROUND OF THE INVENTION

In some conventional multi-core microprocessors, the manufacturer may blow fuses on each core of the microprocessor to specify to each core the configuration of the cores on the multi-core microprocessor so that each core can statically determine from the fuse values which cores of the multi-core microprocessor are enabled to perform data processing in the system. Although this solution may have advantages, a disadvantage is that once the fuses are blown on the core for use in a first multi-core microprocessor configuration, the core with already-blown fuses may not be useable in a different second multi-core microprocessor configuration in the event that demand for the second configuration arises. Furthermore, in other conventional systems, the system BIOS may query the cores and determine the core configuration and write the configuration information to control registers (e.g., MSR) of the multi-core microprocessor; however, although this solution may also have advantages, a disadvantage is that it is not always possible for the multi-core microprocessor manufacturer to control the development and release of the system BIOS. Finally, individual cores of a multi-core microprocessor may be defective as manufactured or may fail during testing or operation. Therefore, what is needed is a more robust method for determining the core configuration of a multi-core microprocessor.

BRIEF SUMMARY OF INVENTION

In one aspect, the present invention provides a microprocessor with a core configuration discovery process that does not rely on off-core logic or queries by system BIOS. In another aspect, the present invention provides a core configuration discovery method that does not rely on off-core logic or queries by system BIOS. In some aspects, the core configuration refers to the number of, and identification of, enabled cores in the processor. In other aspects, the core configuration may refer to a hierarchical coordination system of the multi-core processor, such as a nodal map of the cores for certain inter-core communication processes or restricted activities, and/or an identification of various domains and domain masters within an applicable hierarchical coordination system. In yet other aspects, the core configuration may identify resources, such as voltage sources, clock sources, and caches, shared by various domains of the microprocessor.

In another aspect, at least some, and preferably all, of the cores are configured with configuration discovery microcode to discover a configuration of the microprocessor's cores. In various alternative aspects, the microcode carries out a configuration discovery process that is either top-down (i.e., beginning with a root core), bottom-up (i.e., beginning with each of several terminal cores), or intermediate (e.g., master-mediated, beginning with each of several master cores).

In a top-down configuration discovery process, the root core queries each of its subordinate kin cores for configuration information. Each subordinate kin core then responsively queries its own subordinate kin cores, if any, for configuration information, in a recursive fashion, until terminal cores are reached, and the each subordinate core responsively returns applicable configuration information to the requesting core until the root core has obtained configuration revealing messages, or timed out waiting for such messages, from each subordinate kin core. The root core then collects the configuration information to identify a configuration for the entire microprocessor. In some embodiments, the root core then redistributes the configuration information to its subordinate kin cores, and they to their subordinate kin cores, if any, until all of the cores share the same configuration information.

In a bottom-up configuration discovery process, each terminal core sends a configuration-revealing message to its most immediate master core. After receiving such messages, or timing out waiting for such messages, from each of its subordinate kin cores, each master core then responsively collects and generates a composite configuration-revealing message to its master core, if any. This process continues recursively, until the root core receives, or times out waiting for, configuration-revealing messages from each of its subordinate kin cores. The root core then collects the configuration information to identify a configuration for the entire microprocessor. In some embodiments, the root core then redistributes the configuration information to its subordinate kin cores, and they to their subordinate kin cores, if any, until all of the cores share the same configuration information.

In yet another aspect, a master-mediated configuration discovery process and corresponding microprocessor is provided. The microprocessor comprises a plurality of semiconductor dies, each of which comprises a plurality of processing cores, wherein one of the plurality of processing cores of each of the dies is designated as the master core. Each of the master cores is configured to query each of the other cores of its die to determine the number of enabled cores of the die, in response to a reset of the microprocessor; and to coordinate with the master core of each of the other dies to determine the number of enabled cores of the microprocessor, after determining the number of enabled cores of the die.

In related aspects, each of the cores having composite configuration information for the entire microprocessor is further configured to use, in response to various circumstances, the discovered configuration information during operation of the microprocessor. In one such circumstance, each so-informed core is configured to provide the determined number of enabled cores of the microprocessor as a result value in response to execution of a user program instruction that requests the number of cores of the microprocessor. In another such circumstance, each so-informed core is configured to perform power state management of the multi-core microprocessor based on the discovered configuration information. In another such circumstance, each so-informed core is configured to synchronize power state changes by the cores based on the discovered configuration information. In a related aspect, each so-informed core is configured to manage a shared voltage source based on discovered configuration information identifying cores that share the voltage source. In another related aspect, each so-informed core is configured to manage a shared clock source based on discovered configuration information identifying cores that share a clock source.

In a further aspect, each master core is configured to treat a kin core as not enabled if it does not respond to a query from the master core, or provide an expected configuration revealing message to the master core, within a predetermined amount of time.

In another aspect, each of the master cores is configured to coordinate with the master core of each of the other dies by sending a message to the master core of each of the other dies that specifies the determined number of enabled cores of the die, and to receive a message from the master core of each of the other dies that specifies the determined number of enabled cores of the other die.

In yet another aspect, each of the dies includes inter-core communication wires used by the master core to query each of the other cores of its die to determine the number of enabled cores of the die, and inter-die communication wires used by the master cores to coordinate with master cores of each of the other dies to determine the number of enabled cores of the microprocessor.

In another aspect, a master-mediated method for dynamically determining the configuration of a multi-core microprocessor is provided. Each die master core queries each of the other cores of its die to determine the number of enabled cores of the die, in response to a reset of the microprocessor. Each die master core also coordinates with the master core of each of the other dies to determine the number of enabled cores of the microprocessor, after determining the number of enabled cores of its own die.

In yet another aspect, a computer program product encoded in at least one computer readable storage medium is provided for use with a computing device. The computer program product comprises computer readable program code embodied in said medium, for specifying a microprocessor. In particular, the computer readable program code comprises program code for specifying a plurality of semiconductor dies, wherein each of the dies comprises a plurality of processing cores, and wherein one of the plurality of processing cores of each of the dies is designated as the master core. The computer readable program code further provides specifications to configure each of the master cores to query each of the other cores of its die to determine the number of enabled cores of the die, in response to a reset of the microprocessor; and coordinate with the master core of each of the other dies to determine the number of enabled cores of the microprocessor, after determining the number of enabled cores of its own die.

In another aspect, the computer readable storage medium is selected from the set of a disk, tape, or other magnetic, optical, or electronic storage medium and a network, wire line, wireless or other communications medium.

DETAILED DESCRIPTION OF THE INVENTION

The present invention provides embodiments of multi-core multiprocessors that engage in a highly flexible and scalable inter-core configuration discovery process. In some embodiments, an inter-core configuration discovery process is carried out at least in part, through sideband communication lines connecting the cores. Also, in some embodiments, an inter-core configuration discovery process is carried out in accordance with an applicable hierarchical coordination system between the cores. In some embodiments, the hierarchical coordination system corresponds to physical packaging layout (i.e., cores grouped into dies and dies grouped into packages) for the cores of the multi-core multiprocessor. In other embodiments, the hierarchical coordination system differs from the microprocessor's physical packaging layout.

Accordingly, before describing each of the Figures, which represent detailed embodiments for use with an inter-core configuration discovery process, more general applicable concepts of the invention are introduced below.

I. Multi-Layer Multi-Core Processor Concepts

As used herein, a multi-core processor generally refers to a processor comprising a plurality of enabled physical cores that are each configured to fetch, decode, and execute instructions conforming to an instruction set architecture. Generally, the multi-core processor is coupled by a system bus, ultimately shared by all of the cores, to a chipset providing access to peripheral buses to various devices. In some embodiments, the system bus is a front-side bus that is an external interface from the processor to the rest of the computer system. In some embodiments, the chipset also centralizes access to a shared main memory and a shared graphics controller.

The cores of the multi-core processor may be packaged in one or more dies that include multiple cores, as described in the section of Ser. No. 61/426,470, filed Dec. 22, 2010, entitled "Multi-Core Processor Internal Bypass Bus," and its concurrently filed nonprovisional Ser. No. 13/299,014, which are incorporated herein by reference. As set forth therein, a typical die is a piece of semiconductor wafer that has been diced or cut into a single physical entity, and typically has at least one set of physical I/O landing pads. For instance, some dual core dies have two sets of I/O pads, one for each of its cores. Other dual core dies have a single set of I/O pads that are shared between its twin cores. Some quad core dies have two sets of I/O pads, one for each of two sets of twin cores. Multiple configurations are possible.

Furthermore, a multi-core processor may also provide a package that hosts multiple dies. A "package" is a substrate on which dies reside or are mounted. The "package" may provide a single set of pins for connection to a motherboard and associated processor bus. The package's substrate includes wire nets or traces connecting the pads of the dies to shared pins of the package.

Further levels of stratification are possible. For example, an additional layer—described herein as a "platform"—may be provided between multiple packages mounted on that platform and an underlying motherboard. The platform may be, in many ways, like the package described above, comprising a substrate with wire nets or traces connecting the pins of each package and the shared pins of the platform.

Applying the concepts above, in one example, a multi-package processor can be characterized as a platform of N2 packages, having N1 dies per package, and N0 cores per die, where N2, N1, and N0 are each greater than or equal to one, and at least one of N2, N1, and N0 is greater than or equal to two.

II. Inter-Core Communication Structures

As noted above, in some embodiments, an inter-core configuration discovery process is carried out at least in part, through sideband communication lines connecting the cores. In particular, sideband wires, such as inter-core communication wires or inter-die communication wires, connect the cores, and are used to discover a configuration of the microprocessor.

For example, as described in Ser. No. 13/299,014, a multi-core multiprocessor may be provided that includes a multi-core die that provides a bypass bus between cores of the die. The bypass bus is not connected to the physical pads of the die; hence, it does not carry signals off the dual core die. The bypass bus also provides improved quality signals between the cores and enables the cores to communicate or coordinate with each other without using the system bus.

The present invention also contemplates sets of inter-core communication wires less extensive than Ser. No. 13/299,014's bypass bus, such as alternative inter-core communication wire embodiments described in the section of Ser. No. 61/426,470, filed Dec. 22, 2010, entitled "Reticle Set Modification to Produce Multi-Core Dies," and its concurrently filed nonprovisional (Ser. No. 13/299,171), which are incorporated herein by reference. One example of a less extensive set of inter-core communication wires is illustrated in the section of Ser. No. 61/426,470, filed Dec. 22, 2010, entitled "Distributed Management of a Shared Power Resource to Multi-Core Processor," and its concurrently filed nonprovisional (Ser. No. 13/299,225), which are also herein incorporated by reference. Sets of inter-core communication wires may be as small, in number of included wires, as necessary to enable the configuration discovery activities described herein. Inter-core communication wires may also be configured, and interfaced between cores, in a manner similar to inter-die communication lines described further below.

Furthermore, a multi-core multiprocessor may provide inter-die sideband communication wires between dies of a package, and a platform may provide inter-package sideband communication wires between packages of the platform. These sideband communication wires, like the inter-core sideband communication wires, are external to the system bus. Illustrations of several different configurations of sideband inter-die and inter-package communication lines, formed by wires or traces in the package substrate, are provided in the section of Ser. No. 61/426,470, filed Dec. 22, 2010, entitled "Decentralized Power Management Distributed Among Multiple Possible Cores," and its concurrently filed nonprovisional (Ser. No. 13/299,122), which are incorporated herein by reference.

Several different configurations of inter-die communication wires are contemplated. FIGS. 1, 9, 11, and 12 of Ser. No. 13/299,122, for example, illustrate configurations of inter-die communication wires that enable a master core of each die to communicate with the master core of any other die on the package, in a manner that supports a peer-to-peer coordination model between the master cores. FIG. 14, by contrast, illustrates a hierarchical configuration of inter-die communication wires. There, three sets of inter-die communication wires are provided, a first set linking dies 0 and 1, a second set linking dies 2 and 3, and a third set linking dies 0 and 2.

Several configurations for linking each die to the inter-die communication wires are also contemplated. For example, FIGS. 1, 9, 11 and 21 of Ser. No. 13/299,122 illustrate multi-core dies that each provide and use four sideband communication pads, in addition to any system bus pads, to connect with inter-die communication wires on their respective packages. FIGS. 12, 14, 15, 16, and 22 of Ser. No. 13/299,122, by contrast, illustrate multi-core dies that provide or use only two or three sideband communication pads, in addition to any system bus pads, to connect with inter-die communication wires on their respective packages.

Generally, each die is provided with at least one sideband communication output pad and at least one sideband communication input pad, in addition to its system bus pads, for purposes of inter-die sideband communications. In some embodiments, extra sideband communication pads are provided, and frequently implemented as extra sideband communication input pads, to support a wider variety of multi-core implementations and/or accommodate a wider variety of inter-core coordination systems. In some embodiments, the packages on which the dies are mounted provide corresponding pins to interconnect the inter-die communication wires with corresponding inter-die communication wires of other packages, again in a manner that bypasses the system bus.

In some embodiments, a die's inter-die communication pads are controlled by a designated master core of the die. In further embodiments, control of the inter-die communication pads of a die can be negotiated and/or reassigned to another core of the die.

Furthermore, on each die, several different configurations of inter-core communication wires are contemplated. For example, as described in Ser. No. 13/299,014, a quad-core die may provide inter-core communication wires between two sets of twin cores. Alternatively, a quad-core die may provide sets of inter-core communication wires between each of two sets of cores of a die and another set of inter-core communication wires between select cores from the two sets. In yet another embodiment, a die may provide sets of inter-core communication wires between each of the cores, as described in connection with FIG. 16 of Ser. No. 13/299,122. And in yet another embodiment, a quad-core die may provide inter-core bypass buses between a first and second core, the second core and a third core, the third and a fourth core, and the first and fourth cores, without providing inter-core bypass buses between the first and third cores or between the second and fourth cores.

III. Hierarchical Concepts

The layer complexity and sideband communication configuration of a given multi-core microprocessor may constrain the manner in which the microprocessor's cores coordinate processes through its sideband communication wires. Accordingly, in some embodiments, hierarchical coordination systems are used to carry out a configuration discovery process. For sufficiently numerously-cored microprocessors, a given hierarchical coordination system may be very complex. Therefore, before describing FIGS. 1-3 and configuration discovery processes applicable thereto, it is helpful to explain various aspects of various hierarchical coordination systems that are contemplated herein.

For these purposes, it is particularly useful to refer to Ser. No. 13/299,122, whose FIGS. 1, 9, 11, 12, 14, 15, 16, 18, 19, 20, 21, and 22 illustrate a wide range of hierarchical coordination systems that structure and facilitate a power-state discovery and management process.

As used herein, a hierarchical coordination system refers to one in which the cores are configured to coordinate with each other in an at least partially restricted, structured hierarchical manner to carry out certain communications or coordination activities. This is distinguished herein from an equipotent peer-to-peer coordination system in which each core is equally privileged and can directly coordinate with any other core to carry out or perform a pertinent communication or activity. For example, a nodal tree structure in which the cores coordinate, for certain restricted activities, solely with superiorly-ranked or inferiorly-ranked nodally connected cores, and for which there is only a single path between any two nodes, would constitute a strictly hierarchical coordination system. As used herein, a hierarchical coordination system, unless more strictly defined, also encompasses coordination systems that are more loosely hierarchical, such as a system that permits peer-to-peer coordination within at least one group of cores but requires hierarchical coordination between at least two of the core groups.

In one embodiment, a hierarchical coordination system is provided that corresponds to the arrangement of cores in a microprocessor having a plurality of packages, each package having a plurality of dies, and each die having a plurality of cores. It is useful to characterize each layer as a "domain." For example, a dual-core die may be characterized as a domain consisting of its cores, a dual-die package may be characterized as a domain consisting of its dies, and a dual-package platform or microprocessor may be characterized as a domain consisting of its packages. It is also useful to describe the core itself as a domain. This conceptualization of "domains" is also useful in referring to a resource, such as a cache, a voltage source, or a clock source, that is shared by cores of a domain but that is otherwise local to that domain (i.e., not shared by cores outside of that domain). Of course, the domain depth and number of constituents per domain (e.g., where a die is a domain, the package is a domain, and so on) applicable to any given multi-core processor can vary and be scaled up or down depending on the number of cores, their stratification, and the manner in which various resources are shared by the cores.

It is also useful to name different types of relationships between domains. As used herein, all of the enabled physical cores on a multi-core die are considered "constituents" of that die and "co-constituents" of each other. Likewise, all of the enabled physical dies on a multi-die package are considered constituents of that package and co-constituents of each other. Also likewise, all of the enabled physical packages on a multi-package processor would be considered constituents of that processor and co-constituents of each other. Again, this representation may be extended to as many levels of domain depth as is provided with the multi-core processor. In general, each non-terminal domain level is defined by one or more constituents, each of which comprises the next lower domain level of the hierarchical structure.

In some multi-core processor embodiments, for each multi-core domain (e.g., for each die, for each package, for each platform, and so on), one and only one core thereof is designated as, and provided with a corresponding functional gate-keeping or coordination role of, a "master" for that domain. For example, a single core of each multi-core die, if any, is designated as a "die master" of that die, a single core of each package is designated a "package master" (PM) of that package, and (for a processor so stratified) a single core of each platform is designated as "platform master" for that platform, and so on. Generally, the master core of the highest domain of the hierarchy serves as the sole "bus service processor" (BSP) core for the multi-core processor, wherein only the BSP is authorized to coordinate certain types of activities with the chipset. It is noted that terms such as "master" are employed herein for convenience, and that labels other than "master"—for example, "delegate"—could be applied to describe such functional roles.

Further relationships are defined between each domain master core and the cores with which it is enabled, for certain predefined activities, to directly coordinate. At the lowest domain level (e.g., a die), the die master core of a multi-core die may be characterized as a "pal" to each of the enabled non-master cores of that die. Generally, each of the cores of a die is characterized as a pal to any of the other cores of the same die. But in an alternative characterization, the pal designation is restricted to subordinate relationships between die master core and the other cores of a multi-core die. Applying this alternative characterization to a four-core die, the die master core would have three pals, but each of the other cores would be considered as having only a single pal—the die master core.

At the next domain level (e.g., a package), the PM core of a package may be characterized as a "buddy" to each of the other master cores on the same package. Generally, each of the die master cores of a package is characterized as a buddy to each other die master core of the same package. But in an alternative characterization, the buddy designation is restricted to subordinate relationships between a package master core and other master cores of that package. Applying this alternative characterization to a four-die package, the PM core would have three pals, but each of the other die master cores would be considered as having only a single pal—the PM core. In yet another alternative characterization (such as that set forth in FIG. 11), a master core is characterized as a "buddy" to each of the other master cores in the processor, including master cores on a different package of the processor.

At the next domain level (e.g., the platform of a multi-core processor having such depth), the BSP (or platform master) core is characterized as a "chum" to each of the other PM cores of the platform. Generally, each of the PM cores is related as a chum to each other PM core of the same platform. But in an alternative characterization, the chum designation is restricted to subordinate relationships between a BSP package master core and other PM cores of a platform. Applying this alternative characterization to a four-package platform, the BSP core would have three pals, but each of the other PM cores would be considered as having only a single pal—the BSP.

The pal/buddy/chum relationships described above are more generally characterized herein as "kinship" relationships. Each "pal" core belongs to one kinship group, each "buddy" core belongs to a higher-level kinship group, and each "chum" core belongs to a yet higher-level kinship group.

In other words, the various domains of the hierarchical coordination system described above define corresponding "kinship" groups (e.g., one or more groups of pals, groups of buddies, and groups of chums). Moreover, each "pal," "buddy," and "chum" core, if any, of a particular core can be more generally characterized as a "kin" core.

As used herein, the concept of a kinship group is slightly distinct from the concept of a domain. As described above, a domain consists of all of the cores in its domain. For example, a package domain generally consists of all of the cores on the package. A kinship group, by contrast, generally consists of select constituent cores of the corresponding domain. A package domain, for instance, would generally define a corresponding kinship group consisting only of the master cores (one of which is also a package master core), but not any of the pal cores, on the package. Generally, only terminal multi-core domains—i.e., domains that have no constituent domains—would define a corresponding kinship group that included all of its cores. For example, a dual-core die would generally define a terminal multi-core domain with a corresponding kinship group that included both of the die's cores. It will be noted that it is also convenient to describe each core as defining its own domain, as each core generally includes resources local to itself, and not shared by other cores, that may be configured by various operating states.

It will be appreciated that in the pal/buddy/chum hierarchy described above, each core that is not a master core is merely a pal, and belongs to a single kinship group consisting only of cores on the same die. Every die master core belongs, first, to the lowest level kinship group consisting of pal cores on the same die and, secondly, to a kinship group consisting of buddy cores on the same package. Every package master core belongs, first, to a lowest level kinship group consisting of pal cores on the same die, secondly, to a kinship group consisting of buddy cores on the same package, and thirdly, to a kinship group consisting of chum cores on the same platform. In short, each core belongs to W kinship groups, where W equals the number of kinship groups for which that core is a master core, plus 1.

To further characterize of the hierarchical nature of the kinship groups, the "closest" or "most immediate" kinship group of any given core corresponds to the lowest-level domain of which that core is a part. In one example, no matter how many master designations a particular core has, its most immediate kinship group comprises its pal(s) on the same die. A master core would also have a second closest kinship group comprising the core's buddy or buddies on the same package. A package master core would also have a third closest kinship group comprising the core's chum(s).

It is notable that the kinship groups described above will be semi-exclusive for a multi-level multi-core processor (wherein at least two levels Nx have multiple constituents). That is, for such processors, no given kinship group will include all of the cores of that processor.

The kinship group concept described above can be characterized even further by different models a kinship group may employ for coordination between its constituent cores. As used herein, in a "master-mediated" kinship group, direct coordination between cores is restricted to coordination between the master core and its non-master cores. Non-master cores within the kinship group cannot directly coordinate with each other, but only indirectly through the master core. In a "peer-collaborative" kinship group, by contrast, any two cores of the kinship group may directly coordinate with each other, without the master core's mediation. It should be noted that the distinction defined herein between a "master-mediated" and "peer-collaborative" kinship group is only meaningful for kinship groups having three or more cores. Generally, for certain predefined activities, any given core can only coordinate with constituents or co-constituents of its kinship groups, and, with respect to any master-mediated kinship group of which it is a part, only with superior co-constituent or inferior constituents, as applicable.

It is also convenient to describe the hierarchical coordination systems above in terms of nodes and nodal connections of a nodal hierarchy. As used herein, a nodal hierarchy is one in which each node is a unique one of the cores of the multi-core processor, one of the cores (e.g., the BSP core) is the root node, and there is an unbroken coordination "path" (including intermediate nodes, if applicable) between any two nodes. Each node is "nodally connected" to at least one other node, but not all of the other nodes, and can only coordinate, for purposes of restricted activities to which the coordination system applies, with "nodally connected" cores. To further differentiate these nodal connections, a master core's subordinate nodally connected cores are described herein as "constituent" cores and alternatively as "subordinate kin" cores, which are distinguished from a core's nodally connected "co-constituent cores," which are nodally connected cores that are not subordinate to itself. Further clarifying, a core's nodally connected "co-constituent" cores consist of its master core, if any, and any equally ranked cores to which it is nodally connected (e.g., in a peer-coordinated kinship group of which the core is a part). Also, any cores that have no subordinate kin cores are also referred to herein as "terminal" nodes or "terminal" cores.

Up until this point, hierarchical coordination systems have been described, for purposes of clarity, in which the domains correspond to physically distinct nested arrangements of cores (e.g., a distinct domain corresponds to each applicable core, die, package, and platform). FIGS. 1, 9, 12, 16, and 22 of Ser. No. 13/299,122, for example, all illustrate hierarchical coordination systems that correspond with the physically distinct nested packages of cores illustrated in the processor. FIG. 22 of Ser. No. 13/299,122 is an interesting consistent example. It illustrates an octacore processor 2202 with asymmetric packages, one of which has three dual-core dies and the other of which has a single-core die. Nevertheless, consistent with the physically distinct nested manner in which the cores are packaged, sideband wires are provided that define a corresponding three-level hierarchical coordination system, with package masters related as chums, die masters related as buddies, and die cores related as pals.

But, depending on the configuration of the inter-core, inter-die, and inter-package sideband wires, if any, of a processor, hierarchical coordination systems between cores may be established that have a different depth and stratification than the nested physical arrangements in the processor's cores are packaged. Several such examples are provided in FIGS. 11, 14, 15, and 21 of Ser. No. 13/299,122. FIG. 11 of Ser. No. 13/299,122 illustrates an octa-core processor having two packages, with two dies per package, and two cores per die. In FIG. 11 of Ser. No. 13/299,122, sideband wires facilitating a two-level hierarchical coordination system are provided, so that all of the master cores may be part of the highest-level kinship group, and each master core also belongs to a distinct lowest-level kinship group comprising itself and its pals. FIG. 14 of Ser. No. 13/299,122 illustrates an octa-core processor having four dual-core dies on a single package. In FIG. 14, sideband wires requiring a three-level hierarchical coordination system of pals, buddies, and chums are provided. FIG. 15 of Ser. No. 13/299,122 illustrates a processor with two quad-core dies where inter-core wires within each die require a two-level hierarchical coordination system between them, and inter-die wires providing a third hierarchical level of coordination are provided between the masters (i.e., chums) of each die. FIG. 21 of Ser. No. 13/299,122 illustrates another octacore processor that, like FIG. 22, has two asymmetric packages, one of which has three dual core dies and the other of which has a single dual core die. But, like FIG. 11, inter-die and inter-package sideband wires are provided that facilitate a two-level hierarchical coordination system between the cores, will all of the master cores on both packages being part of the same kinship group.

As explained above, hierarchical coordination systems of different depths and coordination models can be applied, as desired or as applicable to the distribution of shared resources provided for a multi-core processor, provided it is consistent with the structural capabilities and constraints of the multi-core processor. To further illustrate, FIG. 16 of Ser. No. 13/299,122 shows a processor that provides sufficient sideband communication wires to facilitate a peer-collaborative coordination model between all of the cores of each quad-core die. In FIG. 17 of Ser. No. 13/299,122, however, a more-restrictive, master-mediated coordination model is established for the cores of each quad-core die. Moreover, as illustrated in FIG. 15 of Ser. No. 13/299,122, a multi-level coordination hierarchy, with two pal kinship groups and one master kinship group, could also, if desired, be established for the quad-core microprocessor's cores, simply by using less (for purposes of the activities to which the coordination system applies) than all of the available inter-core wires. Because each quad-core die in FIG. 16 of Ser. No. 13/299,122 provides sideband wires between each of its cores, the die is capable of facilitating all three types of hierarchical coordination systems.

Generally, regardless of the nature and number of domains, kinship groups, and nodes of a multi-core processor, one and only of the cores of each domain and each corresponding kinship group will be designated as the master of that domain and corresponding kinship group. Domains may have constituent domains, and again, one and only of the cores of each domain and corresponding kinship group will be designated as the master of that domain. The highest ranking core of the coordination system is also referred to as a "root node."

IV. Specific Illustrated Embodiments

Figure 1:
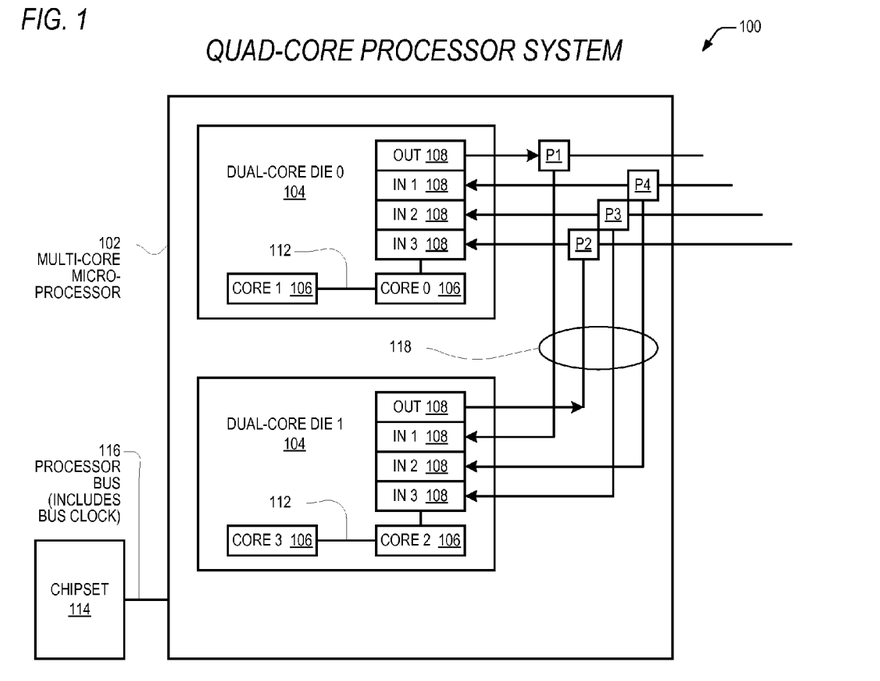
FIG. 1 is a block diagram illustrating a computing system including a multi-core microprocessor according to the present invention.

Referring now to FIG. 1, a block diagram illustrating a computing system 100 including a multi-core microprocessor 102 according to the present invention is shown. The system 100 of FIG. 1 is described in detail with respect to FIG. 1 of Ser. No. 13/299,122.

The system 100 includes a single chipset 114 coupled to the multi-core microprocessor 102 by a system bus 116 that include a bus clock. The multi-core microprocessor 102 package includes two dual-core dies 104, denoted die 0 and die 1. The dies 104 are mounted on a substrate of the package.

Each of the dual-core dies 104 includes two processing cores 106. Die 0 includes core 0 and core 1, and die 1 includes core 2 and core 3. The two cores 106 within each die 104 communicate via inter-core communication wires 112 that are internal to the die 104. More specifically, the inter-core communication wires 112 enable the cores 106 within a die 104 to interrupt one another and to send one another messages to coordinate various discovery and management processes between them, including discovery of the microprocessor's configuration.

In one embodiment, the inter-core communication wires 112 comprise a bus having parallel lines. In a related embodiment, the inter-core communication wires 112 comprise a bypass bus similar to that described in Ser. No. 13/299,014. In other embodiments, the inter-core communication wires 112 comprise a relatively smaller set of inter-core communication wires, comparable in various aspects to alternative sideband configurations described in Ser. No. 13/299,014 and Ser. No. 13/299,223 or comparable to the inter-die communications wires described in Ser. No. 13/299,122.

As discussed with respect to FIG. 1, the term "pal" is used to refer to cores 106 on the same die 104 that communicate with one another over corresponding sideband inter-core communication wires. Thus, in the embodiment of FIG. 1, core 0 and core 1 are pals, and core 2 and core 3 are pals.

Each die 104 provides a plurality of system bus pads for coupling the die to the system bus and a plurality of additional sideband communication pads for coupling the dies to inter-die communication wires 118. Specifically, each die 104 includes four sideband communication pads 108 coupled to four respective pins, denoted "P1", "P2", "P3", and "P4". Of the four sideband communication pads 108, one is an output pad (denoted "OUT") and three are input pads (denoted IN 1, IN 2, and IN 3). In one embodiment, each die 104 is assigned one of the four pads 108 as its output pad (OUT) based on a configuration fuse blown during manufacturing of the multi-core microprocessor 102.

In FIG. 1, the package itself provides a corresponding plurality of sideband communication pins, designated P1 to P4, that are coupled to its inter-die communication wires 118. While such pins are not necessary for carrying out inter-die communications between dies on the package, the pins facilitate external testing of signals carried on the inter-die communication wires 118 and enable larger, multi-package configurations.

The inter-die communication wires 118 are configured as follows. The OUT pad of die 0 and the IN 1 pad of die 1 are coupled to pin P1 via a single wire net; the OUT pad of die 1 and the IN 3 pad of die 0 are coupled to pin P2 via a single wire net; the IN 2 pad of die 0 and the IN 3 pad of die 1 are coupled to pin P3 via a single wire net; and the IN 1 pad of die 0 and the IN 2 pad of die 1 are coupled to pin P4 via a single wire net.

Each die 104 also has a designated master core 106 that controls communications through the die's sideband communication pads. In the embodiment of FIG. 1, core 0 is the master core 106 of die 0, and core 2 is the master core 106 of die 1. In connection with FIG. 1, the term "buddy" refers to master cores 106 on different dies 104 that communicate via sideband inter-die communication wires with one another; thus, in the embodiment of FIG. 1, core 0 and core 2 are buddies.

The inter-die communication wires 118 interconnect the master cores 106 of the dies 104 to further facilitate communication and coordination of various discovery and management processes between them, including, as described herein, discovery of the microprocessor's configuration. More specifically, the inter-die communication wires 118 enable the master cores 106 on distinct dies 104 to interrupt one another and to send one another messages to perform decentralized coordination and discovery activities distributed among the cores 106 of the multi-core microprocessor 102.

For example, when master core 0 of die 0 wants to communicate with master core 2 of die 1, it transmits information on its OUT pad to the IN 1 pad of die 1; similarly, when master core 2 of die 1 wants to communicate with master core 0 of die 0, it transmits information on its OUT pad to the IN 3 pad of die 0. As noted in Ser. No. 13/299,122, not all of the pads and pins shown in FIG. 1 are needed to support a quad-core configuration, and some of them may be removed. But, as also noted in Ser. No. 13/299,122, the additional pads and pins facilitate other processor configurations, such as octa-core embodiments. In some such processor configurations, each OUT pad 108 is coupled to multiple IN pads 108 of other dies 104. To support such configurations, the master core 106 in one embodiment includes an identifier in each message it transmits out of its OUT pad 108 on its inter-die communication wire 118. The identifier uniquely identifies the destination core 106 to which the message is destined, to enable the multiple recipient cores 106 that receive the broadcast message to detect whether it is the intended destination.

Although the multi-core microprocessor 102 embodiment of FIG. 1 is manufactured with four physical cores 106, each core 106 includes an enable indicator 252 (of FIG. 2) that may be selectively blown to enable or disable the core 106 such that the number of cores 106 available to the system 100 to perform data processing may be less than the number of physical cores 106. Therefore, advantageously, microcode 208 of each core 106 is configured to perform a dynamic configuration discovery process to determine which of the physical cores 106 are enabled such that they are available to the system 100 to perform data processing, as described herein. The microcode 208 advantageously uses the inter-core communication wires 112 and the inter-die communication wires 118 to perform the dynamic configuration discovery process, as described herein.

Figure 2:
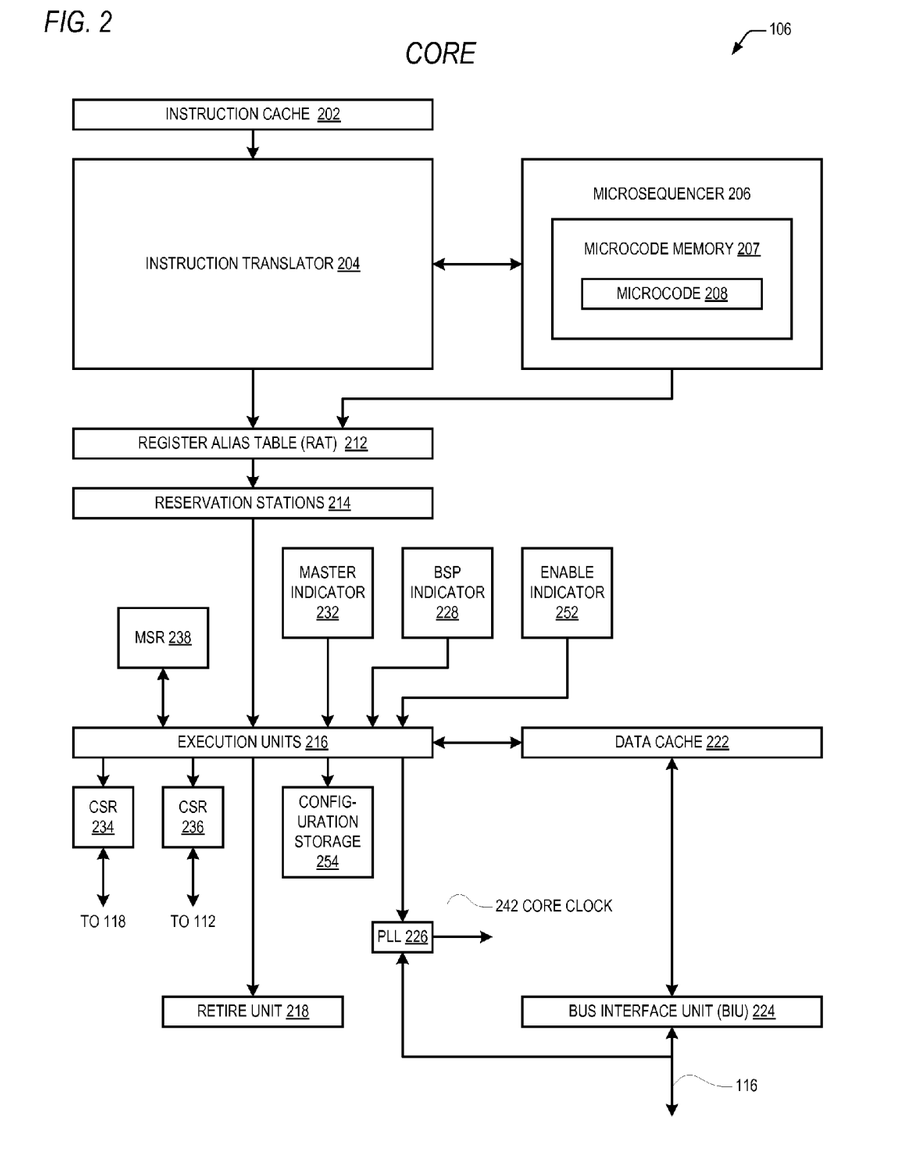
FIG. 2 is a block diagram illustrating in detail a representative one of the cores of FIG. 1 according to the present invention.

Referring now to FIG. 2, a block diagram illustrating in detail a representative one of the cores 106 of FIG. 1 according to the present invention is shown. The core 106 of FIG. 2 is substantially described in detail with respect to FIG. 2 of the disclosure of Ser. No. 13/299,122, with additional aspects described further below.

According to one embodiment, the core 106 microarchitecture comprises a superscalar, out-of-order execution pipeline of functional units. An instruction cache 202 caches instructions fetched from a system memory (not shown). An instruction translator 204 is coupled to receive instructions, such as x86 instruction set architecture instructions, from the instruction cache 202. A register alias table (RAT) 212 is coupled to receive translated microinstructions from the instruction translator 204 and from a microsequencer 206 and to generate dependency information for the translated microinstructions. Reservation stations 214 are coupled to receive the translated microinstructions and dependency information from the RAT 212. Execution units 216 are coupled to receive the translated microinstructions from the reservation stations 214 and to receive instruction operands for the translated microinstructions. The operands may come from registers of the core 106, such as general purpose registers and readable and writeable model-specific registers (MSR) 238, and from a data cache 222 coupled to the execution units 216. A retire unit 218 is coupled to receive instruction results from the execution units 216 and to retire the results to architectural state of the core 106. The data cache 222 is coupled to a bus interface unit (BIU) 224 that interfaces the core 106 to the bus 116 of FIG. 1. A phase-locked-loop (PLL) 226 receives the bus clock signal from the bus 116 and from it generates a core clock signal 242 to the various functional units of the core 106. The PLL 226 may be controlled, such as disabled, via the execution units 216.

As discussed above in connection with FIG. 1, each die has a designated master core. Moreover, in a related aspect, the processor may have a designated boot service processor (BSP) core which alone is authorized to coordinate certain restricted activities with the chipset 114. Accordingly, different embodiments for credentialing cores with master and/or BSP designations, and for complying with such designations, are contemplated.

In one embodiment, each core 106 includes programmable configuration fuses. The manufacturer of the die 104 may blow some configuration fuses to designate which of the cores 106 is the master core of the die 104, may blow other configuration fuses to designate a core 106 as a BSP. Additionally, the manufacturer of the die 104 may blow further configuration fuses to designate to each core 106 a uniquely identifying instance, i.e., whether the core 106 is core 0, core 1, core 2, or core 3.

In another embodiment, the master designation of any given core is provided in accordance with its instance. According to one embodiment, the even-numbered core 106 is, by default, the master core of each die 104. According to a related embodiment, core 0 is designated the boot service processor (BSP) of the multi-core microprocessor 102.

In yet another embodiment, an initial master or BSP designation is provided by default (e.g., based on conditions of applicable configuration fuses or based on the core's instance), but may be overridden by a new configuration. And in a further embodiment, master and BSP designations are dynamically reconfigured, or temporarily set aside by corresponding provisional designations, in response to various conditions, such as a designated master or BSP core being in a disabled or suspended condition.

Returning to FIG. 2, the execution units 216 receive a BSP indicator 228 and a master indicator 232 that indicate whether the core 106 is the master core of the die 104 and the BSP core of the multi-core microprocessor 102, respectively. As discussed above, the BSP indicator 228 and master indicator 232 may comprise programmable fuses. In an alternative embodiment, the BSP indicator 228 and master indicator 232 are stored in a model specific register (MSR) 238 that is initially populated with the programmable fuse values, but which may be updated by software writes to the MSR 238.

Additionally, the core 106 includes an enable indicator 252 that indicates whether the core 106 is enabled to perform data processing. Still further, the core 106 includes configuration storage 254 for storing the core configuration of the multi-core microprocessor 102. In one embodiment, the configuration storage 254 comprises registers; in another embodiment, the configuration storage 254 comprises storage locations within a small random access memory (RAM), such as the PRAM as described in U.S. Pat. No. 7,827,390.

The execution units 216 also read and write control and status registers (CSR) 234 and 236 to communicate with the other cores 106. In particular, the core 106 uses the CSR 236 to communicate with cores 106 on the same die 104 via the inter-core communication wires 112, and the core 106 uses the CSR 234 to communicate with cores 106 on other dies 104 via the inter-die communication wires 118 through the pads 108, as described in Ser. No. 13/299,122.

The microsequencer 206 also includes a microcode memory 207 configured to store microcode. The processing cores 106 are symmetric in that they each have the same instruction set architecture and are configured to execute user programs comprising instructions from the instruction set architecture. For purposes of the present disclosure, the term "microcode" used herein refers to instructions that are executed by the same core 106 that executes architectural instructions of the core 106. That is, any microcode stored in the microcode memory 207 executes, if at all, on its native core 106.

The microcode memory 207 stores microcode that includes internal power state management microcode such as described, in a variety of embodiments, in Ser. No. 13/299,122. The microcode memory 207 also stores microcode that includes decentralized configuration discovery microcode 208 as described herein. More particularly, the microcode 208 is configured, as described below with respect to the method of FIG. 3, to dynamically determine the core configuration of the multi-core microprocessor 102, to store information specifying the dynamically determined core configuration into the configuration storage 254, and to use the stored information. In one embodiment, as described below, the decentralized configuration discovery microcode 208 is triggered by assertion of a reset pin of the multi-core microprocessor 102. Moreover, the core's internal power state management microcode described in Ser. No. 13/299,122 coordinates power state management in accordance with the configuration it discovers and stores in response to execution of its configuration discovery microcode 208.

The configuration discovery microcode 208 facilitates a decentralized core configuration discovery process that does not require the use of active non-core logic devices. The multi-core microprocessor 102 may very well include an adjunct or service processor (not shown), in addition to the cores 106, that does not have the same instruction set architecture as the cores 106. However, according to the present invention, the cores 106 themselves, rather than the adjunct or service processors and rather than any other non-core logic device, perform the decentralized core configuration discovery process in response to a reset assertion. This may advantageously provide enhanced scalability, configurability, yield properties, power reduction, and/or die real estate reduction over a design having dedicated hardware for performing the power management on behalf of the cores. Moreover, in some embodiments supporting selective enablement and disablement of cores and/or reconfiguration of the hierarchical coordination system and applicable domain designations, the configuration discovery microcode is duplicated on each core 106.

Figure 3:
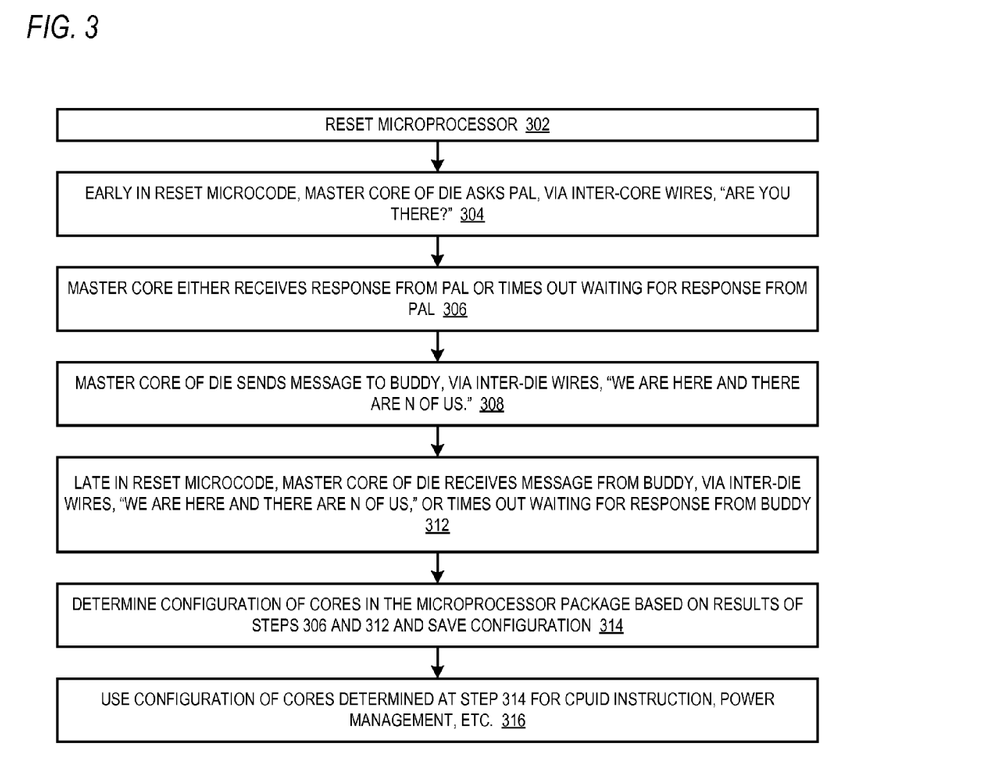
FIG. 3 is a flowchart illustrating operation of the multi-core microprocessor of FIG. 1 to perform a dynamic configuration process according to the present invention.

Referring now to FIG. 3, a flowchart illustrating operation of the multi-core microprocessor 102 of FIG. 1 to perform a dynamic configuration discovery process according to the present invention is shown. Flow begins at block 302.

At block 302, the multi-core microprocessor 102 is reset. In one embodiment, the reset occurs due to the assertion of a reset pin of the multi-core microprocessor 102. The assertion of the reset pin may be performed by the system 100, such as by a motherboard that comprises the multi-core microprocessor 102. Additionally, the assertion of the reset pin may occur as the result of a power up of the multi-core microprocessor 102. In response to the reset, each core 106 begins executing a reset routine of the microcode 208.

Flow proceeds to block 304, where the reset microcode 208 participates in a decentralized configuration discovery process. In an top-down embodiment, the reset microcode 208 determines, by reading relevant fuse indicator 228 or its MSR 238, whether the native core (i.e., the core on which the reset microcode 208 is running) is a BSP or root core 106, and if so, sends a configuration discovery request to a subordinate kin core (such as a buddy core 106 on the same package or a pal core 106 on the same die 104), if any. In a related master-initiated embodiment, the reset microcode 208 determines, by reading relevant fuse indicators 232 or its MSR 238, whether the native core is a master core 106, and if so, sends a configuration discovery request to a subordinate pal core (such as a pal core 106 on the same die 104). As a specific example, a die master core may send a configuration discovery request, via inter-core wires, to its pal core asking "are you there."

In an alternative bottom-up embodiment, the reset microcode 208 detects whether it is a terminal core (i.e., has no master designations at all), and if so, sends its master core a message containing relevant configuration information about itself. In both the top-down, master-initiated, and bottom-up embodiments, the reset microcode 208 preferably sends configuration discovery requests and/or receives configuration revealing messages via sideband communication wires, such as inter-core communication wires 112 or inter-die communication wires 118, to and from the subordinate kin core 106.

Different embodiments of configuration revealing message contents are contemplated. In various embodiments, the message may reveal whether the core is enabled, what master credentials, if any, it has, the domain levels and/or kinship groups to which the core belongs, the numbers of cores in one or more of the corresponding domain levels and/or kinship groups, a map or Godel number, or combination thereof, revealing the nodal hierarchical relationship of core with respect to any subordinate cores, and/or an identification of resources (e.g., voltage sources, clock sources, and caches), if any, shared by the cores' domains.

Flow proceeds to block 306, where the reset microcode 208 receives configuration revealing messages from subordinate kinship cores 106, if any, or times out waiting to receive them.

For example, the master core 106 of the die 104 may have sent a discovery configuration request to a pal core 106 in block 304 and waits to receive a message in response thereto. If the pal core 106 does not respond to the master core 106 after a predetermined amount of time, the master core 106 assumes the pal core 106 is not enabled or is not operational for some other reason. Moreover, the reset microcode 208 makes a note of whether the pal core 106 is enabled. Alternatively, a non-terminal core 106 of the microprocessor may be waiting to receive configuration disclosing messages from its subordinate kin cores. After a predetermined amount of time, the non-terminal core 106 assumes that it has received messages from all enabled subordinate kin core and that any other subordinate kin cores are not enabled or are not operational for some other reason.

In embodiments in which each die 104 includes more than two cores 106, the reset microcode 208 of a relevant master core 106, in one embodiment, sends a discovery request messages at block 304 to each of its subordinate kin cores 106, and each subordinate kin core 106 either receives a response message or detects a timeout event at block 306. In embodiments in which each die 104 includes only a single core 106, the reset microcode 208 of the master core 106 does not send a message at block 304, receive a response message, or detect a timeout event at block 306, and when the reset microcode 208 sends the message at block 308 (discussed below), the message indicates that the number of cores 106 on the master core's 106 die 104 is one. Flow proceeds to block 308.

At block 308, the reset microcode 208 of the master core 106 of an applicable domain (e.g., the master core 106 of a die 104) gathers up the information obtained at block 306 and determines a composite configuration of the cores of its domain. In one embodiment, the master core 106 then sends a corresponding configuration revealing message to a higher-level master core, if any, or if not, saves the configuration information as described in block 314. In a more dispersive configuration revealing embodiment, the master core 106 sends a composite configuration revealing message to each of its "kin" cores. For example, a die master core 106 may send a message, via the inter-die communication wires 118, to a buddy core 106 which is a master core 106 of another die 104. The message informs the buddy core 106, at a minimum, of the master core's existence and the number of cores 106 in the master core's domain (e.g., on the master core's die). The message may also indicate other configuration information that the master core has gathered, such as the core's other master credentials, if any, the domain levels and/or kinship groups to which the core belongs, numbers of cores in the core's corresponding domain levels and/or kinship groups, a map or Godel number, or combination thereof, revealing the nodal hierarchy of which the core is the master, and/or the resources (e.g., voltage sources, clock sources, and caches), if any, shared by the master core's subordinate domains.

In one embodiment, the master core's composite configuration revealing message is then received by the master core of a higher domain as part of at block 306, which, until a predetermined time limit is reached, continues collecting configuration revealing messages from others, if any, of its subordinate kin cores before proceeding to block 308. In this embodiment, the actions of blocks 308 and 306 continue recursively until the root or BSP core 106 has collected all of the available configuration information, or timed out waiting for it, at which point the reset microcode 208 of the root or BSP core 106 jumps to block 314.

In an alternative more dispersive configuration revealing embodiment, flow proceeds to block 312. In one embodiment, the reset microcode 208 of the master core 106 that sent the configuration revealing message in block 308 to its buddy core 106 symmetrically receives a configuration revealing message from its buddy core 106 via the inter-die communication wires 118. The received message informs the master core 106, at a minimum, of the buddy core's 106 existence and of the number of cores 106 on the buddy core 106 die. That is, the native core 106 receives at block 312 the message which the buddy core 106 sent in his instance of block 308. Similar to the manner described at block 306, the reset microcode 208 may detect a timeout condition if it has not received a response message from the buddy core 106, in which case the microcode 208 assumes the buddy core 106 is not enabled or is not operational for some other reason.

In this alternative embodiment, the steps performed at blocks 304 through 308 are preferably performed temporally early in the reset microcode 208 routine. That is, when the core 106 is reset at block 302, the reset microcode 208 performs a minimal amount of initialization of the core 106, then performs the steps at blocks 304 through 308, then performs the remaining functions necessary to initialize the core 106 (e.g., self-tests, cache configuration, processor state initialization) to be ready to begin fetching and executing user program instructions (e.g., the system firmware/software instructions), then performs the steps at blocks 312 and 314. This gives the master cores 106 of other domains of cores as much time as possible to perform their instances of the steps at blocks 304 through 308; specifically, when the buddy core 106 sends its message to the native core 106 at block 308, the native core 106 receives the message as the response message of block 312, which is discussed below.

In embodiments in which the multi-core microprocessor 102 includes more than two dies 104, the reset microcode 208 of the master core 106 may send a message at block 308 to each buddy core 106 on each die 104 of the multi-core microprocessor 102 and for each buddy core 106 either receive a response message or detect a timeout event at block 312. Alternatively, as indicated above, the reset microcode 208 may send a message at block 308 only to the master core's master core 106 (e.g., the BSP core).

Flow proceeds to block 314, where relevant reset microcode 208 gathers up the information obtained at blocks 306 and 312 and determines the complete configuration of the multi-core microprocessor 102. In a master-mediated embodiment, the master core 106 of each die 104 would determine the configuration of the multi-core microprocessor 102. In the top-down and bottom-up embodiments, initially only the root or BSP core 106, would determine the final configuration, but, in further embodiments thereof, this configuration would then be recursively dispersed to each subordinate kin core until all of the cores had a copy of the final configuration.

Continuing with bock 314, the reset microcode 208 saves the configuration information in the configuration storage 254 of FIG. 2. In one embodiment, the configuration information stored in the configuration storage 254 comprises a table comprising a two-dimensional array of bits in which each row of the array corresponds to a different die 104 in the multi-core microprocessor 102 and each column corresponds to a different core 106 within the die 104 of the row, and the bit value in each cell indicates whether the core 106 is enabled or disabled. In another embodiment, the configuration information stored in the configuration storage 254 comprises an N-dimensional data structure comprising an N-dimensional array of bits in which each dimension correspond to different domain of the multi-core microprocessor 102, and the bit value in each cell indicates whether the core 106 is enabled or disabled. In other embodiments, the reset microcode 208 also saves to configuration storage 254 information specifying which cores 106 are master cores, which cores belong to the native core's kinship group(s), a map or Gödel number, or combination thereof, revealing a complete hierarchical structure (i.e., nodal relationship) of the cores, and/or the resources (e.g., voltage sources, clock sources, and caches), if any, shared by the microprocessor's various domains.

Flow proceeds to block 316, where the core 106 uses the information saved at block 314 to perform various functions. For example, in one embodiment the multi-core microprocessor 102 substantially conforms to the x86 or IA-32 instruction set architecture, which includes a CPUID instruction, and the feature information about the multi-core microprocessor 102 returned by the CPUID instruction includes information about the number of processing cores 106 in the multi-core microprocessor 102 physical package gathered at block 314.

In another example, the core 106 uses the information saved at block 314 to coordinate certain power state management functions, such as implementation of requested C-states, P-states, VID levels, and clock frequencies, as described in connection with Ser. No. 13/299,122 and Ser. No. 13/299,225, for example.

In another example, the core 106 uses the information saved at block 314 to dynamically and selectively disable cores, as described in connection with the section of Ser. No. 61/426,470, filed Dec. 22, 2010, entitled "Dynamic and Selective Core Disablement in a Multi-Core Processor," and its concurrently filed nonprovisional (Ser. No. 13/299,239), which are incorporated herein by reference.

In yet another example contemplated by Ser. No. 13/299, 239, the core 106 uses the information saved at block 314 to statically (e.g., in a BIOS setup) or dynamically (i.e., on the fly) reconfigure the hierarchical coordination system used for the cores, designate other domain masters, and/or designate provisional domain masters in response to various predefined circumstances, such as detecting an overheated core, an overburdened core, core faults or core failures.

For another example, the core 106 uses the information obtained at block 314 to perform power management functions, such as a multi-core power credit feature described in U.S. application Ser. No. 13/157,436, filed Jun. 10, 2011, which is hereby incorporated by reference in its entirety for all purposes. Flow ends at block 316.

In a previous microprocessor without the benefit of the dynamic configuration discovery method described herein, the multi-core microprocessor manufacturer would blow fuses on each core to specify to each core the configuration of the cores on the multi-core microprocessor so that each core could statically determine from the fuse values which cores of the multi-core microprocessor are enabled to perform data processing in the system. Although this solution may have advantages, it is disadvantageous because once the fuses are blown on the core for use in a first multi-core microprocessor configuration, the core with already-blown fuses may not be useable in a different second multi-core microprocessor configuration in the event that demand for the second configuration arises. Furthermore, another possible solution is to have system firmware, such as BIOS, query the cores and determine the core configuration and write the configuration information to control registers, e.g., MSR, of the multi-core microprocessor; however, although this solution may have advantages, it is disadvantageous because it is not always possible for the multi-core microprocessor manufacturer to control the development and release of the system firmware. Thus, the dynamic configuration method described herein is particularly advantageous because it addresses these problems. Yet another advantage of the dynamic configuration method described herein is that the system can still operate even if an individual core or die is failed.

Although embodiments have been described with respect to the quad-core multi-core microprocessor 102 of FIG. 1, other embodiments are contemplated in which the dynamic configuration discovery process described in FIG. 3 may be employed to advantage in multi-core microprocessors with other configurations such as those shown, for example, in FIGS. 9, 14, 15, 16, and 19 of Ser. No. 13/299,122.

In yet other embodiments, the cores 106 differ in various aspects from the representative embodiment of FIG. 2 and provide, instead or addition, a highly parallel structure, such as structures applicable to a graphics processing units (GPU), to the dynamic configuration discovery processes described herein are applied.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor configured to communicate with system memory over a system bus, the microprocessor comprising:
a plurality of semiconductor dies, wherein each of the dies comprises a plurality of processing cores, wherein one of the plurality of processing cores of each of the dies is designated as the master core, wherein each of the master cores is configured to:
communicate with each of the other cores of its die over inter-core communication channels to determine the number of enabled cores of the die, in response to a reset of the microprocessor, and
communicate with the master core of each of the other dies over inter-die communication channels to determine the number of enabled cores of the microprocessor, after determining the number of enabled cores of the die;
wherein the inter-core and inter-die communication channels are external to the system bus.

2. The microprocessor of claim 1, wherein each of the master cores is further configured to:
use the determined number of enabled cores of the microprocessor during operation of the microprocessor.

3. The microprocessor of claim 2, wherein each of the master cores is configured to use the determined number of enabled cores of the microprocessor during operation of the microprocessor by providing the determined number of enabled cores of the microprocessor as a result value in response to execution of a user program instruction that requests the number of cores of the microprocessor.

4. The microprocessor of claim 3, wherein each of the master cores is configured to use the determined number of enabled cores of the microprocessor during operation of the microprocessor by performing power management of the multi-core microprocessor based of the determined number of enabled cores of the microprocessor.

5. The microprocessor of claim 4, wherein each of the master cores is configured to perform power management of the multi-core die based on the determined number of enabled cores of the microprocessor by synchronizing power state changes by the cores.

6. The microprocessor of claim 4, wherein each of the master cores is configured to perform power management of the multi-core die based on the determined number of enabled cores of the microprocessor by managing a shared voltage source.

7. The microprocessor of claim 4, wherein each of the master cores is configured to perform power management of the multi-core die based on the determined number of enabled cores of the microprocessor by managing a shared clock source.

8. The microprocessor of claim 1, wherein each of the master cores is configured to communicate with each of the other cores of its die to determine the number of enabled cores of the die by determining that one of the other cores of the die is not enabled if the one of the other cores of the die does not respond to a message from the master core within a predetermined amount of time.

9. The microprocessor of claim 1, wherein each of the master cores is configured to communicate with the master core of each of the other dies to determine the number of enabled cores of the microprocessor by:

sending a message to the master core of each of the other dies that specifies the determined number of enabled cores of the die; and receiving a message from the master core of each of the other dies that specifies the determined number of enabled cores of the other die.

10. The microprocessor of claim 9, wherein each of the master cores is configured to communicate with the master core of each of the other dies to determine the number of enabled cores of the microprocessor by determining that one of the other master cores is not enabled if the one of the other master cores does not respond to the message from the master core within a predetermined amount of time.

11. The microprocessor of claim 1, wherein each of the dies includes inter-core communication wires that provide the inter-core communication channels used by the master core to communicate with each of the other cores of its die to determine the number of enabled cores of the die, wherein the multi-core microprocessor also includes inter-die communication wires that provide the inter-die communication channels used by the master cores to communicate with the master core of each of the other dies to determine the number of enabled cores of the microprocessor.

12. The microprocessor of claim 1, wherein microcode of the master core of each die is configured to communicate with each of the other cores of its die to determine the number of enabled cores of the die and to communicate with the master core of each of the other dies to determine the number of enabled cores of the microprocessor.

13. A method for dynamically determining the configuration of a multi-core microprocessor configured to communicate with system memory over a system bus comprising multiple semiconductor dies each comprising multiple processing cores, the method comprising:

communicating over inter-core communication channels with, by a master core of each of the dies, each of the other cores of the die to determine the number of enabled cores of the die, in response to a reset of the microprocessor; and communicating over inter-die communication channels with, by the master core of each of the dies, the master core of each of the other dies to determine the number of enabled cores of the microprocessor, after determining the number of enabled cores of the die;

wherein the inter-core and inter-die communication channels are external to the system bus.

14. The method of claim 13, further comprising:
using the determined number of enabled cores of the microprocessor during operation of the microprocessor.

15. The method of claim 14, wherein said using the determined number of enabled cores of the microprocessor during operation of the microprocessor comprises providing the determined number of enabled cores of the microprocessor as a result value in response to execution of a user program instruction that requests the number of cores of the microprocessor.

16. The method of claim 15, wherein said using the determined number of enabled cores of the microprocessor during operation of the microprocessor comprises performing power management of the multi-core microprocessor based of the determined number of enabled cores of the microprocessor.

17. The method of claim 16, wherein said performing power management of the multi-core die based on the determined number of enabled cores of the microprocessor comprises synchronizing power state changes by the cores.

18. The method of claim 16, wherein said performing power management of the multi-core die based on the determined number of enabled cores of the microprocessor comprises management of a shared voltage source.

19. The method of claim 16, wherein said performing power management of the multi-core die based on the determined number of enabled cores of the microprocessor comprises management of a shared clock source.

20. The method of claim 13, wherein said communicating with each of the other cores of the die to determine the number of enabled cores of the die comprises determining that one of the other cores of the die is not enabled if the one of the other cores of the die does not respond to a message from the master core within a predetermined amount of time.

21. The method of claim 13, wherein said communicating with the master core of each of the other dies to determine the number of enabled cores comprises:

sending, by the master core of each of the dies, a message to the master core of each of the other dies that specifies the determined number of enabled cores of the die; and receiving a message, by the master core of each of the dies, from the master core of each of the other dies that specifies the determined number of enabled cores of the other die.

22. The method of claim 21, wherein said communicating with the master core of each of the other dies to determine the number of enabled cores comprises determining that one of the other master cores is not enabled if the one of the other master cores does not respond to the message from the master core within a predetermined amount of time.

23. The method of claim 13, wherein each die includes inter-core communication wires that provide the inter-core communication channels used to perform said communicating with each of the other cores of the die to determine the number of enabled cores of the die, wherein the multi-core microprocessor includes inter-die communication wires that provide the inter-die communication channels used to perform said communicating with the master core of each of the other dies to determine the number of enabled cores of the microprocessor.

24. The method of claim 13, wherein said communicating with each of the other cores of the die to determine the number of enabled cores of the die and said communicating with the master core of each of the other dies to determine the number of enabled cores of the microprocessor are performed by microcode of the master core of each die.

25. A computer program product encoded in at least one computer readable storage medium for use with a computing device configured to communicate with system memory over a system bus, the computer program product comprising:

computer readable program code embodied in said medium, for specifying a microprocessor, the computer readable program code comprising:

program code for specifying a plurality of semiconductor dies, wherein each of the dies comprises a plurality of processing cores, wherein one of the plurality of processing cores of each of the dies is designated as the master core, wherein each of the master cores is configured to:

communicate with each of the other cores of its die over inter-core communication channels to determine the number of enabled cores of the die, in response to a reset of the microprocessor; and communicate with the master core of each of the other dies over inter-die communication channels to determine the number of enabled cores of the microprocessor, after determining the number of enabled cores of the die;

wherein the inter-core and inter-die communication channels are external to the system bus.

26. The computer program product of claim 25, wherein the at least one computer readable storage medium is selected from the set of a disk, tape, or other magnetic, optical, or electronic storage medium and a network, wire line, wireless or other communications medium.

* * * * *